United States Patent

[11] 3,576,478

[72] Inventors Boyd G. Watkins
San Francisco;
Michael J. Selser, Cupertino, Calif.

[21] Appl. No. 861,524
[22] Filed July 22, 1969
[45] Patented Apr. 27, 1971
[73] Assignee Philco-Ford Corporation
Continuation of application Ser. No. 595,163, Nov. 17, 1966, now abandoned, which is a continuation-in-part of application Ser. No. 582,053, Sept. 26, 1966, now abandoned.

[54] IGFET COMPRISING N-TYPE SILICON SUBSTRATE, SILICON OXIDE GATE INSULATOR AND P-TYPE POLYCRYSTALLINE SILICON GATE ELECTRODE
7 Claims, 20 Drawing Figs.

[52] U.S. Cl. 317/235, 148/175
[51] Int. Cl. H01l 11/00, H01l 11/14
[50] Field of Search 317/234 (8), 235 (21.1,22.2,48.7)

[56] References Cited
UNITED STATES PATENTS

| | | | |
|---|---|---|---|
| 3,189,973 | 6/1965 | Edwards et al. | 317/235 |
| 3,289,093 | 11/1966 | Wanlass | 317/235 |
| 3,355,637 | 11/1967 | Johnson | 317/235 |
| 3,386,016 | 5/1968 | Lindmayer | 317/235 |

OTHER REFERENCES
IBM Tech Discl. Bul., " Fabrication of Field Effect Transistors" by Lehman et al., Vol. 8, No. 4, Sept. 1965, pages 677— 678

*Primary Examiner*—Jerry D. Craig
*Attorney*—Robert D. Sanborn

ABSTRACT: Insulated Gate Field Effect Transistor employing a polycrystalline semiconductor surface layer, one strip of which serves as the gate electrode of the IGFET, and another strip of which may serve as a resistor. The semiconductor surface layer is employed as a mask for the diffusion of the source and drain regions, thereby insuring automatic alignment between the gate electrode and the source and drain regions.

FIG. 1
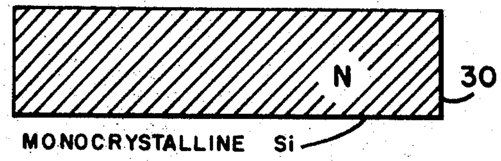
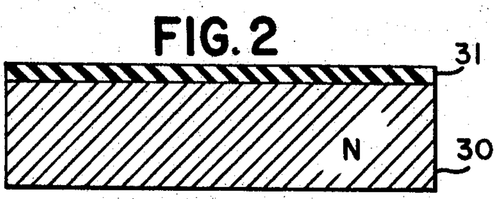
FIG. 3
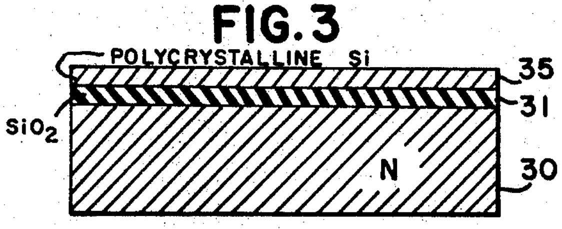
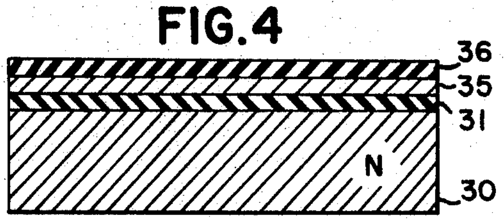
FIG. 5
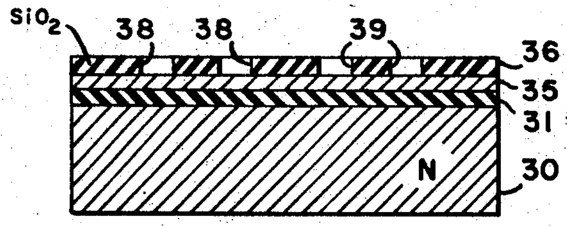
FIG. 6
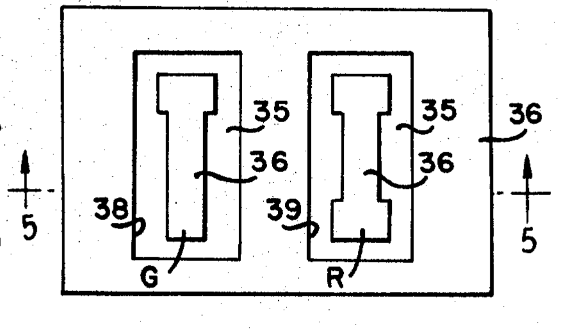
FIG. 7
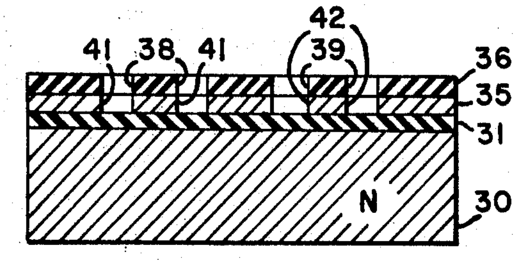
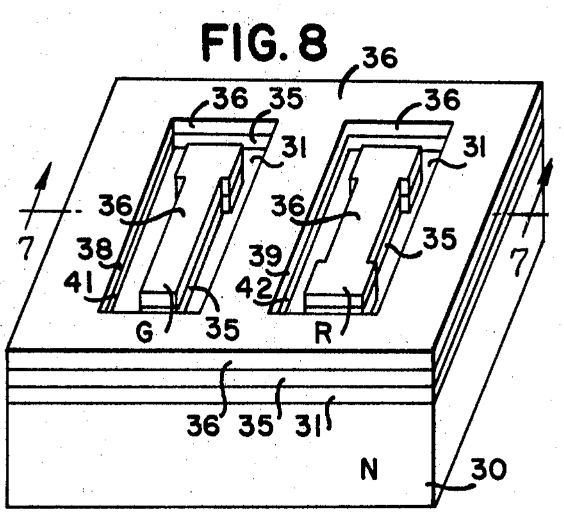
*INVENTORS.*
BOYD G. WATKINS
MICHAEL J. SELSER
*BY* Jack M. Wiseman
ATTORNEY Patented April 27, 1971 3,576,478

3 Sheets-Sheet 2

INVENTORS.
BOYD G. WATKINS
MICHAEL J. SELSER

BY Jack M. Wiseman

ATTORNEY

INVENTORS.
BOYD G. WATKINS
MICHAEL J. SELSER
BY
Jack M. Wiseman
ATTORNEY

IGFET COMPRISING N-TYPE SILICON SUBSTRATE, SILICON OXIDE GATE INSULATOR AND P-TYPE POLYCRYSTALLINE SILICON GATE ELECTRODE

This application is a continuation of our parent application, Ser. No. 595,163, filed Nov. 17, 1966, now abandoned, which in turn is a continuation-in-part of our application, Ser. No. 582,053, filed by us on Sept. 26, 1966, now abandoned.

The present invention relates in general to semiconductor devices, and more particularly to an insulated gate field effect transistor (IGFET).

Heretofore IGFETS have included a metallic gate electrode deposited over an oxide layer on the surface of a semiconductor wafer or substrate. Since the electrode has a work function different from that of the underlying semiconductor (usually silicon), a potential difference exists across the oxide layer. The electric field created by this potential difference induces a voltage in the surface region of the underlying semiconductor; this voltage may change the conductivity, or even the conductivity type, of this region. Such a change in conductivity type, termed inversion, is particularly harmful when it occurs, without design, in a region of semiconductive material of one conductivity type which separates regions of the opposite conductivity type (e.g., the source and drain regions of an enhancement IGFET) since the inversion destroys the rectifying junctions normally existing between these regions.

An object of the present invention is to provide an IGFET wherein inversion between adjacent diffused regions is minimized, when not desired.

Several additional objects to the present invention are:

1. to provide a MOST wherein polycrystalline silicon serves as an electrostatic shield to reduce undesired inversion between adjacent diffused regions.
2. to provide a MOST wherein polycrystalline silicon is employed for forming a silicon resistor.
3. to provide a MOST wherein polycrystalline silicon is used for forming a resistor with crossunder.
4. to provide a MOST in which a thicker gate oxide may be employed without changing the transistor's gate-to-source threshold conduction voltage.
5. to provide an IGFET in which polycrystalline silicon is employed as part of the gate.
6. to provide an IGFET in which an improved ratio between the transistor's gate-to-source threshold conduction voltage and the breakdown voltage of the transistor's surface oxide layer is achieved.

Other and further objects and advantages of the present invention will be apparent to one skilled in the art.

DRAWINGS

Figure 9:
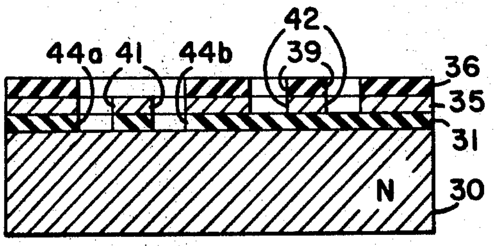
Figure 11:
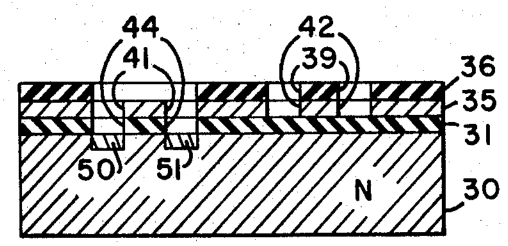
Figure 10:
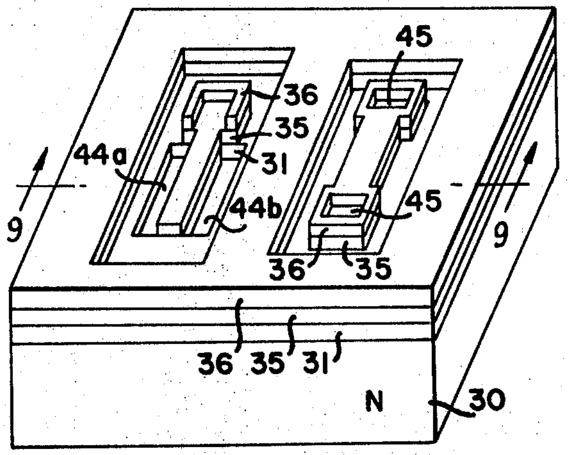
Figure 12:
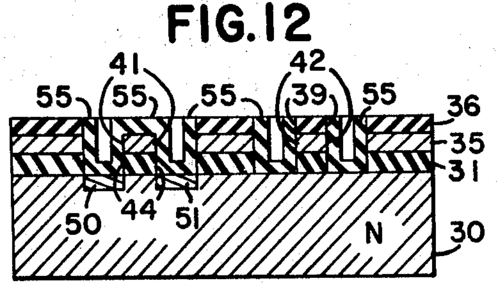
Figure 13:
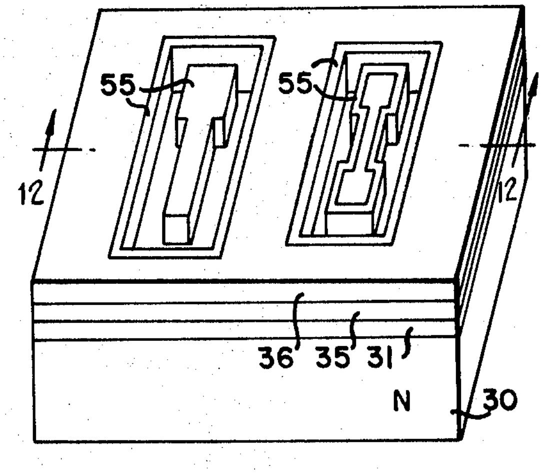
Figure 14:
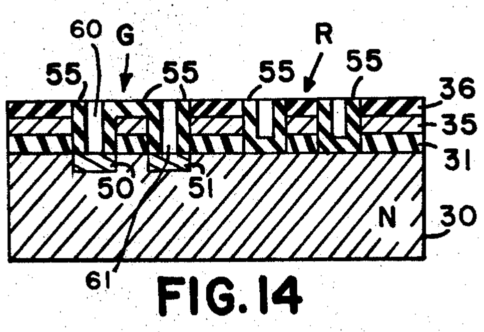
Figure 15:
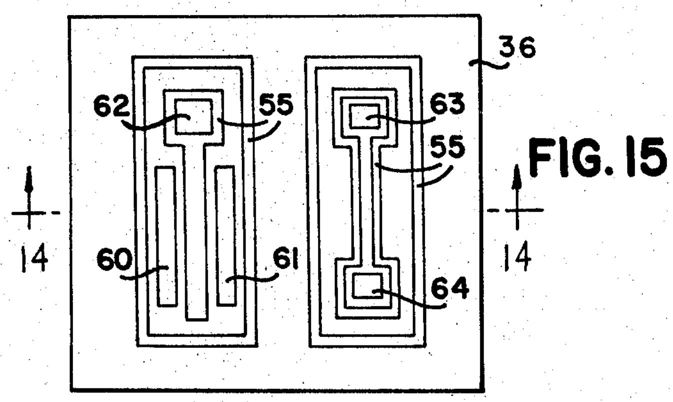
Figures 16, 18:
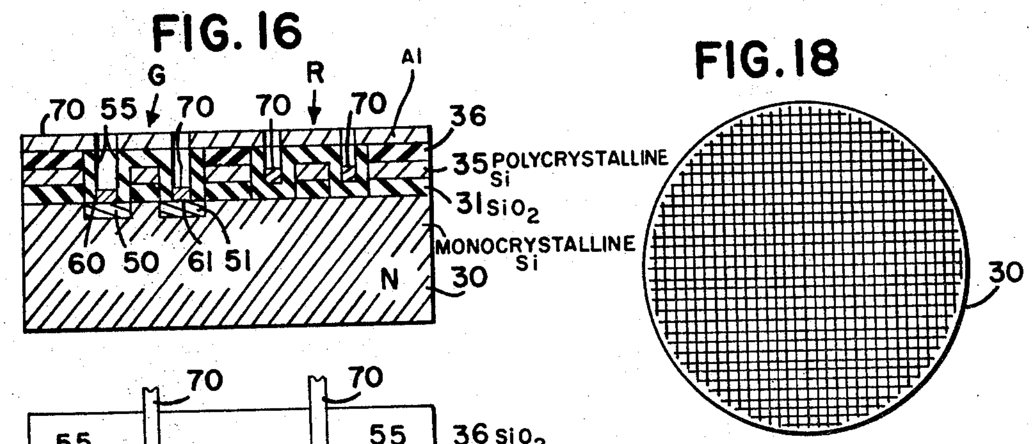
Figure 17:
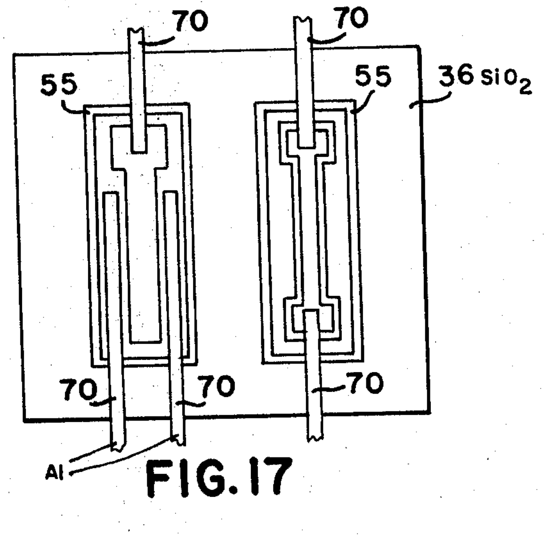
Figure 19:
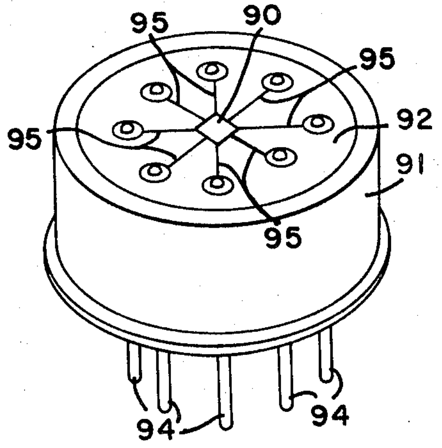
Figure 20:
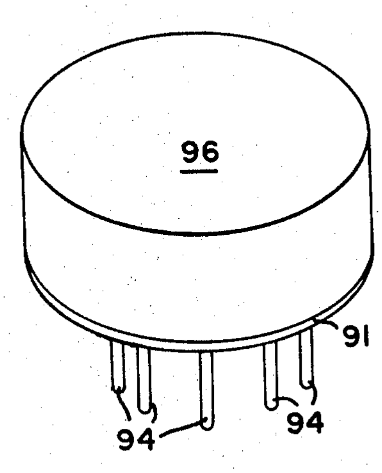

FIGS. 1 to 20 depict the following successive stages of fabrication of an IGFET according to the invention: FIG. 1, starting wafer; FIG. 2, wafer oxidized; FIG. 3, silicon layer (polycrystalline) grown on oxide; FIG. 4, second oxide layer grown on silicon layer; FIGS. 5 and 6, mask openings, etched in second oxide layer; FIGS. 7 and 8, gate- and resistor-defining openings etched in silicon layer; FIGS. 9 and 10, mask and contact openings etched in first and second oxide layers; FIG. 11, source and drain diffused; FIGS. 12 and 13, exposed silicon surfaces reoxidized; FIGS. 14 and 15, source and drain contact openings etched in first oxide layers; FIG. 16, aluminum contact film formed; FIG. 17, aluminum film etched to form contact strips; FIG. 18, wafer scribed; FIG. 19, wafer mounted on header, and FIG. 20, wafer encapsulated. The sectional views of FIGS. 5, 7, 9, 12, and 14 are taken at the locations indicated by section lines in FIGS. 6, 8, 10, 13, and 15, respectively.

Illustrated in FIG. 1 is an N-type silicon semiconductor monocrystalline wafer 30. Conventionally, wafer 30 is lapped, cleaned, degreased and chemically etched to remove lapping damage on the surface and to prepare the same for the succeeding step.

A film, coating or layer 31 (FIG. 2) of silicon oxide is then wafer 30, which oxide layer preferably is silicon dioxide. As is well-known in the art, the oxide layer can be grown in a furnace employing steam or dry oxygen as a suitable oxidizing agent or by the pyrolytic decomposition of siloxanes.

According to the present invention, a film, coating or layer 35 (FIG. 3) of polycrystalline silicon is formed on the exposed surface of the oxide layer 31. Depositing or growing a layer of silicon on the oxide layer 31 will form the layer or coat 35 of polycrystalline silicon.

Conventional techniques are employed to deposit or grow the polycrystalline layer 35. For example, it can be accomplished by vacuum evaporation of silicon onto the oxide layer 31, either in a closed tube system wherein a halogen or halide is used to transfer silicon from a source maintained at a low temperature to the oxide layer at a higher temperature, or in an open-tube system wherein silicon is deposited by the reaction of silicon tetrachloride or a chlorinated silane with hydrogen. Temperatures for the growth may be in the neighborhood of 1200° C. with a growth rate in the order of 1u/min. to 5u/min. In the preferred embodiment, the procedure of vacuum evaporation of silicon onto the heated layer 31 of silicon oxide is employed.

After the foregoing is completed, a second silicon oxide layer 36 (FIG. 4) is grown over the polycrystalline silicon layer 35. The oxide layer 36 is grown in a manner similar to that described for the formation of the oxide layer 31. In the exemplary embodiment, the oxide layer 36 is silicon dioxide.

At this time, portions of the oxide layer 36 are removed to form openings 38 and 39 FIGS. 5 and 6) to expose the polycrystalline layer 35. In the exemplary embodiment, the opening 38 surrounds the region forming a gate electrode G and the opening surrounds the region forming a resistor R.

For removing portions of the oxide layer 36 to open the windows 38 and 39, selective etching techniques and procedures are performed. For example, photo-resist techniques or photolithography may be used. In this regard, photosensitive material which acts as a mask against chemical etchants is employed. Commonly used photosensitive materials for this purpose are sold under the tradenames KPR, KMER and KPL, all of which are manufactured by the Eastman-Kodak Company.

By way of illustration, KPR is applied to the oxide layer 36. The KPR is dried with air and heated to form a hard emulsion. The wafer 30 is held down by a vacuum and a glass mask is placed over the substrate 30. The mask is aligned and lowered and the assembly is then retained in a jig. Next the assembly is exposed to ultraviolet light, which penetrates the clear portion of the glass mask to polymerize the entire surface of the KPR, except the masked locations designated for the openings 38 and 39. The polymerized photosensitive material is etch resistant.

The unexposed photosensitive material is unpolymerized and is removed by a suitable solvent. The remaining KPR layer serves as an etching mask for the underlying silicon dioxide layer 36; a suitable etchant for silicon dioxide is an etching solution of hydrofluoric acid. After etching the openings 38 and 39, the polymerized photoresist is removed by a suitable solvent, such as sulfuric acid.

Now, portions of the polycrystalline silicon layer 35 are removed to form openings 41 and 42 FIGS. 7 and 8). Openings 41 and 42 conform to the configuration of the openings 38 and 39 formed in the oxide layer 36 and are located respectively in vertical alignment therewith.

As previously described, silicon dioxide requires an etching solution of hydrofluoric acid. However, polycrystalline silicon requires a different etching solution, which, in the preferred embodiment, comprises 15 parts by volume of conc. nitric acid, 5 parts by volume of glacial acetic acid, and 2 parts by volume of conc. acid. The oxide layer 36 is employed as a mask to form the openings 41 and 42 in the layer of polycrystalline silicon 35; the portions of the polycrystalline silicon 35 exposed by the openings 38 and 39 being subjected to the polycrystalline silicon etchant solution form the openings 41 and 42.

Next, portions of the first oxide layer 31 FIGS. 9 and 10) are openings 44*a* and 44*b*. Also the portion of the second oxide layer 36 above the gate region is removed. Portions of the oxide layer 36 are also removed over the resistor contact pads to form openings 45. Photoresist techniques, as previously described, are used to define the openings 44 and 45. Opening 44*a* provides an access for the diffusion of a source region and opening 44*b* provides an access for the diffusion of a drain region.

Since the polycrystalline silicon is not affected by hydrofluoric acid, which etches silicon dioxide, the layer of polycrystalline silicon 35 can be employed as a mask to form the openings 44*a* and 44*b* in the oxide layer 31. The remaining portions of the oxide layer 36 and the oxide layer 31 surrounding the resistor portion are protected by the KPR mask.

The KPR mask is removed and the wafer 30 is now cleaned in a conventional manner by suitable means, such as a hydrofluoric acid dip.

P-type regions are now diffused in the wafer 30 through the openings 44*a* and 44*b* to form the source region 50 and the drain region 51 (FIG. 11). During this diffusion the gate and the resistor contact pads (layer 35) will be doped to provide low resistance polycrystalline regions. The diffusion can be performed with boron by metering boron trichloride into a carrier gas (which contains oxygen to reduce pitting) at a diffusion temperature of 1150° C. for 60 minutes. Boron diffusion is well-known in the art and is described in "Microelectronics" by Edward Keonjian, published by MCGraw-Hill Book Company, Inc. 1963, pages 274—276. Next an oxide layer 55 FIGS. 12 and 13) is grown over the source region 50, the drain region 51 and the exposed portions of the polycrystalline silicon layer 35. The oxide layer 55, which may be silicon oxide or silicon dioxide, is grown in a manner similar to that described for the formation of the oxide layer 31. In the exemplary embodiment, the oxide layer 55 is silicon dioxide. In the present state of the art, the diffusion and reoxidation can be carried out in the same furnace.

Portions of the oxide layers 55 are removed to form openings 60—64 (FIGS. 14 and 15). The opening 60 exposes the source region 50, the opening 61 exposes the drain region 51, the opening 62 exposes the gate pad and the openings 63 and 64 expose the resistor pad. The foregoing is accomplished in a manner previously described for forming the openings 38, 39 and 44.

Thereupon, a thin metallic film 70 (FIG. 16), such as aluminum, is vacuum deposited over the face of the wafer onto the exposed surfaces of the oxide layers 31, 36 and 55. The aluminum thin film 70 provides contacts to the semiconductor device. The aluminum film 70 is deposited either in a conventional evaporator by heating aluminum by means of a refractory metal filament or by electron beam evaporation.

Portions of the aluminum film 70 are removed (FIG. 17) to form the contact configuration shown. For this purpose, conventional photoresist and photoetching techniques are employed similar to those described for the removal of an oxide layer. Sodium hydroxide or Auro-Strip, however, is used as the etchant. The aluminum is then alloyed to the underlying semiconductor in a conventional manner.

Now, the wafer 30 (FIG. 18) is diced into a plurality of separate semiconductor devices, such as semiconductor chip on device 90 (FIG. 19). The semiconductor device 90 is packaged within a header 91. In the header 91 is a hard insulating glass, such as borosilicate. The device 90 is embedded in the glass 92 and is connected to the package conductor leads 94 by interconnecting conductor leads 95, which are bonded by soldering or welding to make the necessary electrical connections. A cap 96 (FIG. 20) is hermetically sealed to the header 91.

It should be noted that that the polycrystalline silicon layer 35 serves as a mask for defining the source and drain regions. By virtue thereof, the fabrication of large arrays are facilitated. Thus, an improved method is obtained for automatic alignment of the gate electrode G.

It also should be observed that the above procedure obviates the need for the usual 2 to 4 micron gate overlap with respect to the source and drain regions. The elimination of metal overlap tends to reduce Miller capacity, which greatly limits the speed of performance in switching digital and logic operations.

Since the resistor R is formed from a polycrystalline silicon layer which is formed on a layer of silicon dioxide its geometry and hence its value can be more precisely controlled than a diffused resistor. Since the resistor R is isolated by a surrounding oxide layer, it can be used as a crossunder, and other regions of the same layer 35 of polycrystalline silicon may be used as crossunders, where needed. Since the resistor R is isolated by the oxide layer 31, it has very low capacitance with the substrate 30.

By virtue of the polycrystalline silicon layer 35 being employed as the gate electrode G in lieu of a conventional aluminum metal region, the gate oxide thickness of the device of the present invention can now be increased without increasing the transistor's gate-to-source threshold conduction voltage. This can be accomplished because of the reduction in the gate-to-substrate work function difference when polycrystalline silicon is used as the gate electrode. Since the gate oxide layer 31 is always covered by the polycrystalline silicon layer 35, it will never be exposed to any etchant so that pin holes in the gate oxide will be reduced.

We claim:

1. In an insulated gate field effect transistor of the type comprising:

a monocrystalline semiconductive wafer composed essentially of N-type silicon, said wafer having a surface, said wafer including spaced-apart P-type source and drain regions which extend from respective portions of said surface into said wafer, a film of a silicon oxide covering at least that region of said surface between said respective portions thereof, and a conductive gate electrode contiguous said oxide film and insulated thereby from said wafer, said gate electrode overlying said region of said surface between said respective portions thereof, the improvement wherein said gate electrode is a layer composed essentially of polycrystalline silicon containing a P-type impurity in an amount sufficient to render said gate electrode conductive.

2. The structure of claim 1 further including a resistor formed over said surface at a location spaced from said gate electrode and said source and drain regions, said resistor comprising (a) a polycrystalline layer of silicon, (b) a pair of contacts positioned at spaced locations on said layer, said silicon layer of said resistor being configured so as to provide a predetermined resistance between said pair of contacts, and (c) a layer of a silicon oxide, surrounding and contiguous said silicon layer of said resistor and having a thickness sufficient to insulate said silicon layer of said resistor from said wafer and to enable said silicon layer of said resistor to serve as a crossunder in said structure.

3. A structure according to claim 2, wherein said silicon oxide of said film and said silicon oxide of said layer surrounding and contiguous said silicon layer of said resistor are both silicon dioxide.

4. The structure of claim 2 further including a layer of a silicon oxide positioned over said gate electrode, said polycrystalline layer of silicon of said resistor being an elongated strip with widened areas at said spaced locations thereon.

5. The structure of claim 1 further including a layer of a silicon oxide positioned over said gate electrode.

6. The structure of claim 1 wherein said source and drain regions are shaped and located so that the portion of said surface of said wafer between said source and drain regions is elongated and has parallel opposing major edges, said gate electrode also being elongated and having parallel opposing major edges, the major edges of said gate electrode being parallel to the major edges of said elongated portion of said wafer.

7. A transistor according to claim 1, wherein said silicon oxide is silicon dioxide.